US010997934B2

(12) United States Patent
Mori

(10) Patent No.: US 10,997,934 B2
(45) Date of Patent: May 4, 2021

(54) DISPLAY CONTROL DEVICE, LIQUID CRYSTAL DISPLAY DEVICE, AND TELEVISION RECEIVER

(71) Applicant: SHARP KABUSHIKI KAISHA, Sakai (JP)

(72) Inventor: Tomohiko Mori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/759,076

(22) PCT Filed: Oct. 26, 2018

(86) PCT No.: PCT/JP2018/039891
§ 371 (c)(1),
(2) Date: Apr. 24, 2020

(87) PCT Pub. No.: WO2019/083016
PCT Pub. Date: May 2, 2019

(65) Prior Publication Data
US 2020/0327856 A1 Oct. 15, 2020

(30) Foreign Application Priority Data

Oct. 27, 2017 (JP) .............................. JP2017-208379

(51) Int. Cl.
*G09G 3/36* (2006.01)
(52) U.S. Cl.
CPC ......... *G09G 3/3614* (2013.01); *G09G 3/3659* (2013.01); *G09G 2340/16* (2013.01)

(58) Field of Classification Search
CPC . G09G 2340/16; G09G 3/3614; G09G 3/3659
See application file for complete search history.

(56) References Cited

U.S. PATENT DOCUMENTS

| 2011/0109666 | A1 | 5/2011 | Owa et al. |
| 2013/0162698 | A1 | 6/2013 | Sasaki et al. |
| 2014/0267452 | A1 | 9/2014 | Wakabayashi et al. |
| 2014/0368559 | A1* | 12/2014 | Yamazaki ............ G09G 3/3614 |
| | | | 345/691 |
| 2018/0122311 | A1 | 5/2018 | Mori et al. |
| 2020/0234662 | A1* | 7/2020 | Yabuki ................. G09G 3/3648 |

FOREIGN PATENT DOCUMENTS

| JP | 2005-077508 A | 3/2005 |
| JP | 2011-102876 A | 5/2011 |
| JP | 2013-134400 A | 7/2013 |
| JP | 2014-178362 A | 9/2014 |
| WO | 2016/171069 A1 | 10/2016 |

* cited by examiner

*Primary Examiner* — Dmitriy Bolotin
(74) *Attorney, Agent, or Firm* — ScienBiziP, P.C.

(57) ABSTRACT

Image display control by which effective correction is performed even for a biased change in a source potential for one frame in a liquid crystal display device is achieved. A liquid crystal display device (2) includes a correction unit that corrects a source voltage value to a pixel. The correction unit calculates a correction amount by using an integrated value of a source potential for previous one frame instead of an integrated value of the source potential for next one frame. The liquid crystal display device (2) applies the source voltage based on the correction amount to the pixel.

7 Claims, 10 Drawing Sheets

DISPLAY CONTROL DEVICE, LIQUID CRYSTAL DISPLAY DEVICE, AND TELEVISION RECEIVER

TECHNICAL FIELD

The present invention relates to a display control device, a liquid crystal display device, and a television receiver.

BACKGROUND ART

Television receivers have been recently required to have high-definition display performance corresponding to Super Hi-Vision. As display devices having such high-definition display performance, so-called double-source-drive liquid crystal display devices are known. Such a high-performance liquid crystal display device requires high-speed driving by which image data is written to a pixel in a short time. Therefore, the liquid crystal display device generally has a display control device that controls display thereof.

As the display control device, a display control device of a liquid crystal display device that has a plurality of gate lines, a plurality of source lines, and display pixels arranged correspondingly at intersections of the gate lines and the source lines is known (for example, refer to PTL 1). The display control device further has a generation unit that generates a correction value, an update unit that updates corresponding correction data, and a correction unit that generates image data based on an updated correction value and supplies the resultant to a driving unit. The generation unit generates correction values based on integrated values of first and second data lines from the past to the present for a certain vertical scanning period (frame). The update unit updates the correction values so that at least one of the correction values is a value between the correction values.

Moreover, as the display control device, a display control device including a correction circuit that obtains output gray scales of a present frame that are given to a display pixel is known (for example, refer to PTL 2). The correction circuit integrates, for a period of 0.5 frame or longer, values of voltages corresponding to input gray scales that are applied to source lines disposed on both sides of the display pixel, and adds a difference between resultant two integrated values to the values of the voltages. Then, the correction circuit obtains output gray scales of the present frame that are given to the display pixel.

Further, as the display control described above, a technique of correcting image data of pixels and setting a potential of a source line to a potential according to the corrected image data is known (for example, refer to PTL 3). In the image data of the pixels, first, a polarity indicating a relationship between levels of a potential of a common electrode and a potential of a pixel electrode is inverted. Then, the image data of the pixels is corrected so that an average potential of respective pixel electrodes in a frame matches an average potential in the frame when it is assumed that potentials of the pixel electrodes do not change with a change in a potential of a source line.

CITATION LIST

Patent Literature

PTL 1: Japanese Unexamined Patent Application Publication No. 2014-178362 (published on Sep. 25, 2014)
PTL 2: International Publication No. 2016/171069 (published on Oct. 27, 2016)
PTL 3: Japanese Unexamined Patent Application Publication No. 2005-77508 (published on Mar. 24, 2005)

SUMMARY OF INVENTION

Technical Problem

In a related art as described above, a numerical value serving as an indicator for correction is obtained to calculate a correction value on the basis of the numerical value. In the related art, however, the numerical value serving as the indicator is a value that is fixed for one frame. Thus, in the related art, when a source potential changes in a biased manner for one frame, an influence of such a change may not be sufficiently reflected to the correction value.

An aspect of the invention aims to achieve image display control by which effective correction can be performed even for a biased change in a source potential for one frame in a liquid crystal display device.

Solution to Problem

In order to solve the aforementioned problem, a display control device according to a first aspect of the invention controls display of a liquid crystal display device including a plurality of gate lines, a plurality of source lines, and display pixels arranged correspondingly at intersections of the gate lines and the source lines, and the display control device includes a correction unit that corrects a source voltage applied to each of the display pixels. The correction unit calculates a change amount of a source potential of a target display pixel of the display pixels, which is used to calculate a correction value of a source voltage applied to the target display pixel, for next one frame by referring to an integrated value of the source potential of the target display pixel for past one frame with a writing timing of the target display pixel as a start point.

Moreover, in order to solve the aforementioned problem, a liquid crystal display device according to a second aspect of the invention includes the display control device.

Further, in order to solve the aforementioned problem, a television receiver according to a third aspect of the invention includes the liquid crystal display device.

Advantageous Effects of Invention

According to the aforementioned aspects in the invention, it is possible to achieve image display control by which effective correction can be performed even for a biased change in a source potential for one frame in a liquid crystal display device.

DESCRIPTION OF EMBODIMENTS

Embodiment 1

An embodiment of the invention will be specifically described below.

(Configuration of Display Device)

Figure 1:
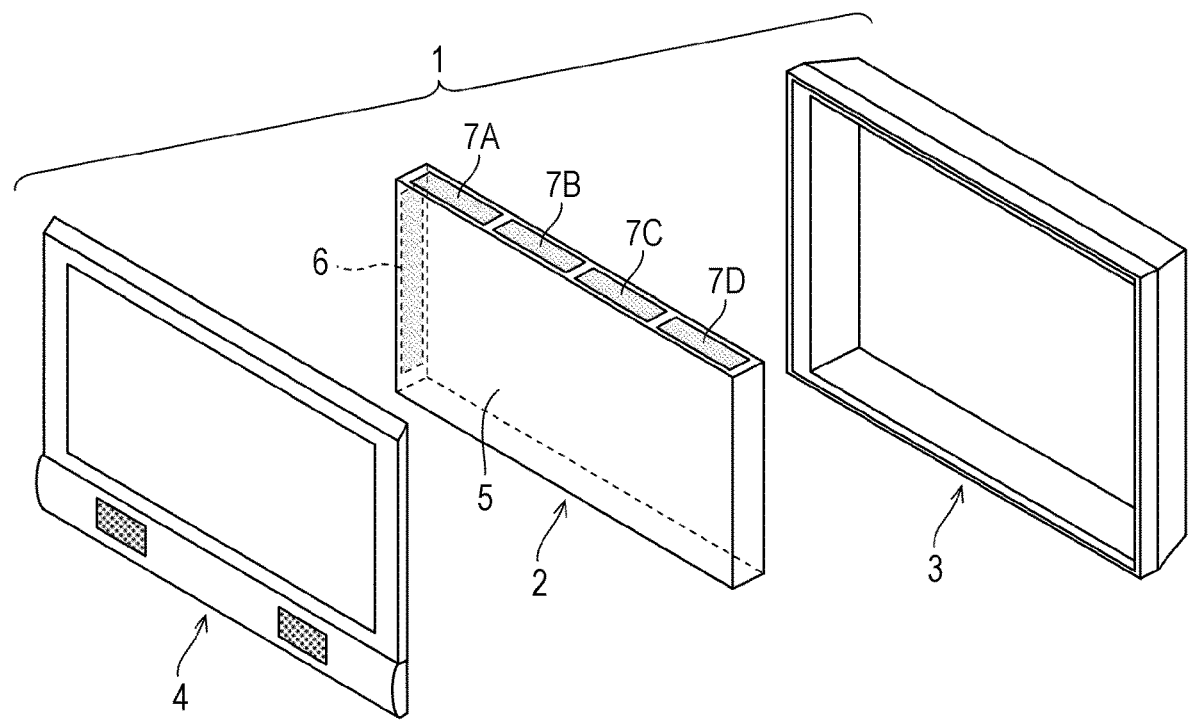
FIG. 1 is an exploded perspective view schematically illustrating a configuration of a television receiver in Embodiment 1 of the invention.

FIG. 1 is an exploded perspective view schematically illustrating a configuration of a television receiver in Embodiment 1 of the invention. The television receiver is able to have a configuration similar to that of a known television receiver except for including a display control device described later.

As illustrated in FIG. 1, a television receiver 1 includes a liquid crystal display device 2, a back-side cabinet 3 in which the liquid crystal display device 2 is stored, and a front-side cabinet 4 which has a frame shape and is attached to a front side of the back-side cabinet 3 in which the liquid crystal display device 2 is stored.

The liquid crystal display device 2 includes a liquid crystal display panel 5, a gate driver 6, and source drivers 7A to 7D. The liquid crystal display device 2 further has a not-illustrated tuner and displays a video according to a video signal received by the tuner. The gate driver 6 and the source drivers 7A to 7D are each arranged in a side portion of the liquid crystal display panel 5 in a rectangular shape. For example, the gate driver 6 is arranged in one side portion along a lateral direction of the liquid crystal display panel 5 and the source drivers 7A to 7D are arranged in one side portion along a longitudinal direction of the liquid crystal display panel 5.

(Configuration of Liquid Crystal Display Device)

Figure 2:
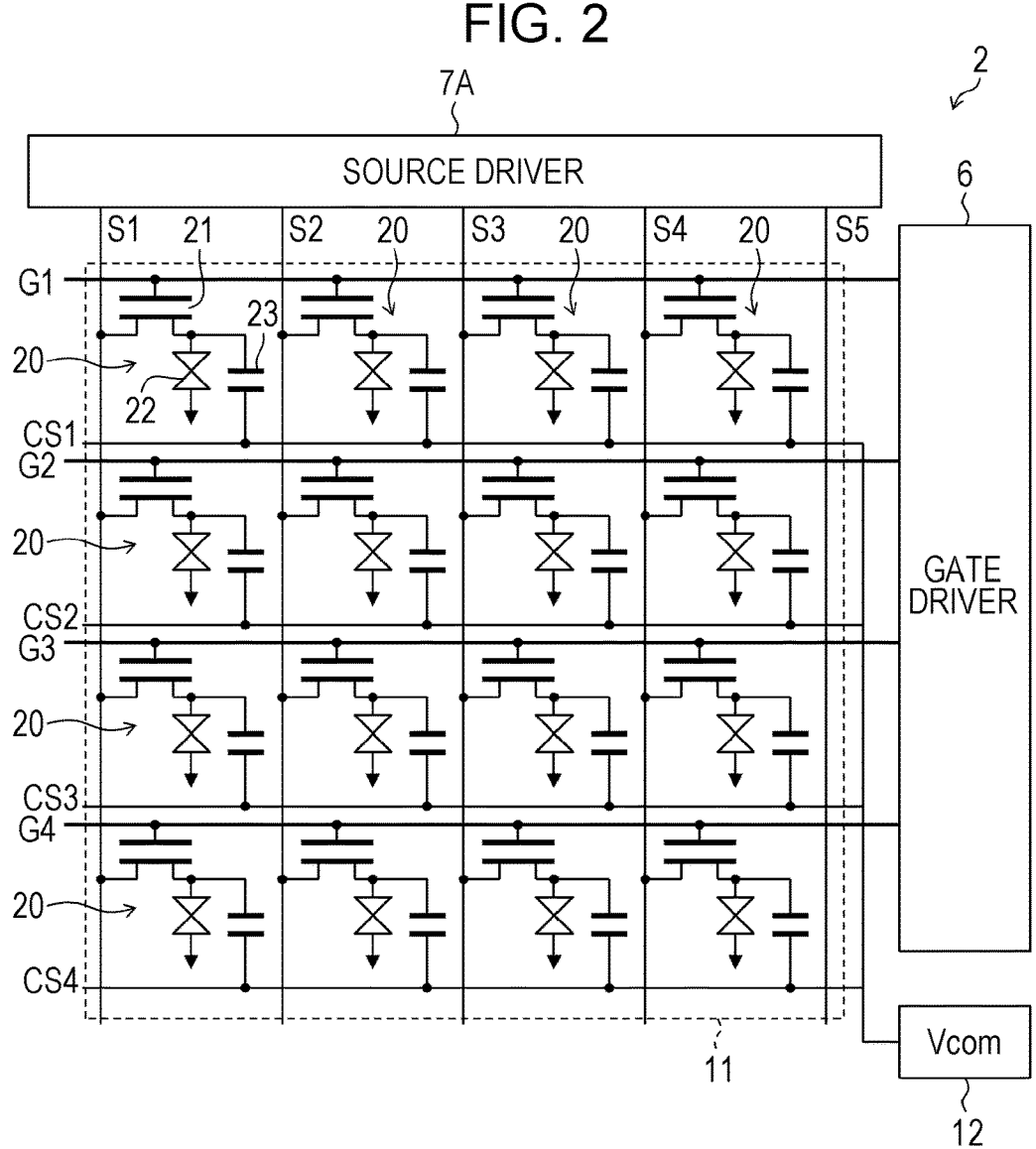
FIG. 2 is a block diagram schematically illustrating a configuration of a liquid crystal display device in Embodiment 1 of the invention.

FIG. 2 is a block diagram schematically illustrating a configuration of the liquid crystal display device in Embodiment 1 of the invention. FIG. 2 schematically illustrates, as an example, a configuration of a part corresponding to the source driver 7A in the liquid crystal display device 2.

As illustrated in FIG. 2, the liquid crystal display device 2 includes the gate driver 6, the source driver 7A, a display unit 11, a CS driver 12, and a not-illustrated display control device. A plurality of gate lines G1 to G4 extend from the gate driver 6 along the longitudinal direction of the liquid crystal display panel 5. A plurality of source lines S1 to S5 extend from the source driver 7A along the lateral direction of the liquid crystal display panel 5. Further, a plurality of storage capacitor wires CS1 to CS4 extend along the longitudinal direction of the liquid crystal display panel 5 between the gate lines in the lateral direction of the liquid crystal display panel 5. The storage capacitor wires are connected to the CS driver 12 that supplies a CS voltage (Vsc).

The liquid crystal display device 2 has pixels (display pixels) 20 at intersections of the gate lines and the source lines. Each of the pixels 20 includes a switching element 21, a pixel electrode 22, and a pixel capacitor 23. The pixel 20 is, for example, a rectangular region sectioned by one gate line G1 and two source lines S1 and S2.

A source line electrically connected to the pixel 20 is different between columns. For example, a pixel 20 in a certain column is connected to one of source lines S regardless of a row number, and a pixel 20 in an adjacent column is connected to the other source line S. Note that, in the present specification, the "row" means an array of pixels in a direction along a gate line and the "column" means an array of pixels in a direction along a source line. In this manner, the liquid crystal display device 2 has a so-called single source line structure.

The switching element 21 is electrically connected to the gate line and one of source lines on both sides, which corresponds to a corresponding one of the pixels 20. The pixel electrode 22 is connected to the switching element 21. The pixel capacitor 23 is electrically connected to the switching element 21 and corresponding one of the storage capacitor wires.

(Configuration of Display Control Device)

Figure 3:
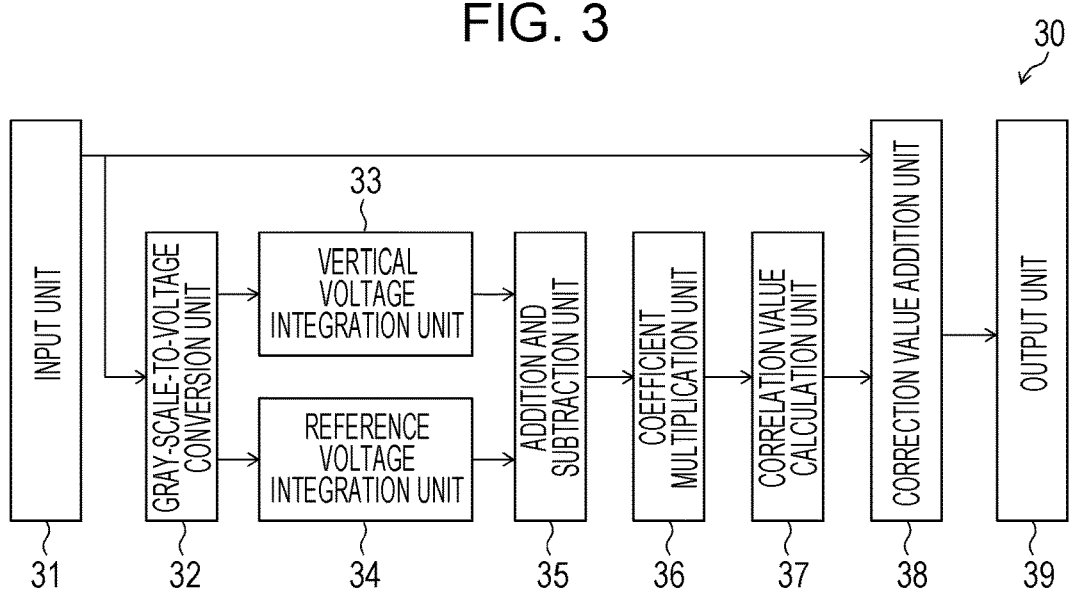
FIG. 3 is a block diagram schematically illustrating an image signal processing circuit in a correction unit of a display control device according to Embodiment 1 of the invention.

The display control device includes a correction unit 30. FIG. 3 is a block diagram schematically illustrating an image signal processing circuit in the correction unit of the display control device according to Embodiment 1 of the invention. The correction unit 30 includes an input unit 31, a gray-scale-to-voltage conversion unit 32, a vertical voltage integration unit 33, a reference voltage integration unit 34, an addition and subtraction unit 35, a coefficient multiplication unit 36, a correction value calculation unit 37, a correction value addition unit 38, and an output unit 39.

(Outline of Display Control)

By using a change amount (change amount for next one frame) of a source potential of a target pixel 20 for next one frame, the correction unit 30 calculates a correction value of the source potential of the target pixel 20. The correction unit 30 is able to calculate a correction value of a source voltage, which is applied to the target pixel, by using a known method as described, for example, in PTL 2 other than calculation of the change amount of the source voltage of the target pixel.

First, the input unit 31 receives an input of the image data of an image displayed in the liquid crystal display device 2. The input unit 31 outputs the image data to the subsequent gray-scale-to-voltage conversion unit 32.

The gray-scale-to-voltage conversion unit 32 converts the image data (input gray scale) input from the input unit 31 into a source voltage. For example, the gray-scale-to-voltage conversion unit 32 converts the input gray scale into the source voltage with use of an LUT (look-up table) in which, with a potential (Vcom) of a common electrode as a reference, a voltage lower than the potential is negative and a voltage higher than the potential is positive. The gray-scale-to-voltage conversion unit 32 outputs the source voltage to the subsequent vertical voltage integration unit 33 and reference voltage integration unit 34.

Operations in the vertical voltage integration unit 33, the reference voltage integration unit 34, and the subsequent addition and subtraction unit 35 will be described later. The change amount of the source potential of the target pixel 20 for the next one frame is obtained by these operations. The addition and subtraction unit 35 outputs the change amount to the subsequent coefficient multiplication unit 36.

The coefficient multiplication unit 36 multiplies the change amount by a coefficient and outputs, to the subsequent correction value calculation unit 37, the change amount multiplied by the coefficient. The coefficient is, for example, a ratio (Csou1/ΣC) of a parasitic capacitance (Csou1) by the source line S1 in the pixel 20 relative to an entire capacitance (ΣC) of the pixel 20.

The correction value calculation unit 37 calculates a correction value (correction gray scale) from the change amount obtained by the coefficient multiplication unit 36 and the gray scale of the pixel 20 and outputs the resultant to the subsequent correction value addition unit 38.

The correction value addition unit 38 adds the correction value (correction gray scale) obtained by the correction value calculation unit 37 to a gray scale of a display image. In this manner, the correction value addition unit 38 calculates the output gray scale after the correction and outputs the resultant to the output unit 39.

Note that, the correction value calculated by the correction value calculation unit 37 can be any of positive and negative values. For example, in a case where the source potential of the pixel 20 fluctuates in a direction in which the pixel 20 becomes bright, the correction value is negative, and in a case of the pixel 20 that fluctuates in a direction in which the pixel 20 becomes dark, the correction value is positive.

The output unit 39 transmits, to the source driver 7A, the corrected output gray scale obtained from the correction value addition unit 38.

(Method of Calculating Change Amount)

Next, a method by which the correction unit 30 calculates the change amount of the source potential of the target pixel will be described. The calculation of the change amount is performed by the vertical voltage integration unit 33, the reference voltage integration unit 34, and the subsequent addition and subtraction unit 35.

The correction unit 30 calculates a change amount (change amount for next one frame) of the source potential of the target pixel 20 for the next one frame by referring to an integrated value of the source potential of the target pixel 20 for past one frame with a writing timing of the target pixel 20 as a start point.

For example, in a case of a frame rate of 60 frames per second, a time required for vertical scanning for one frame is very short and 1/60 second. Thus, a source potential in a certain frame is a good approximation of a source potential of a frame prior to the frame in both a moving image and a still image. Therefore, to obtain the change amount, for example, an integrated value for one frame next to a present time is able to be substantially replaced with an integrated value for one frame prior to the frame. In this manner, by referring to an integrated quantity of the source potential for one most recent actual frame, an integrated value for next one frame is able to be obtained by simpler processing without much processing for actually calculating the integrated value.

A way of using the integrated value for obtaining the change amount is able to be appropriately decided in a range where the change amount is able to be obtained. For example, the correction unit 30 calculates the change amount of the source potential of the target pixel 20 for next one frame by using a difference between two integrated values. A first integrated value is an integrated value of the actual source potential of the target pixel 20 for a period of past one frame with the writing timing of the target pixel 20 as the start point. A second integrated value is an integrated value of the source potential for a period of one frame with the writing timing of the target pixel 20 as the start point.

Figure 4:
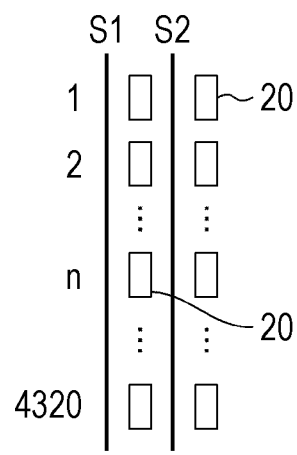
FIG. 4 schematically illustrates pixels in a first column and a second column and two source lines arranged on both sides of a pixel in the first column in the liquid crystal display device according to Embodiment 1 of the invention.
Figure 5:
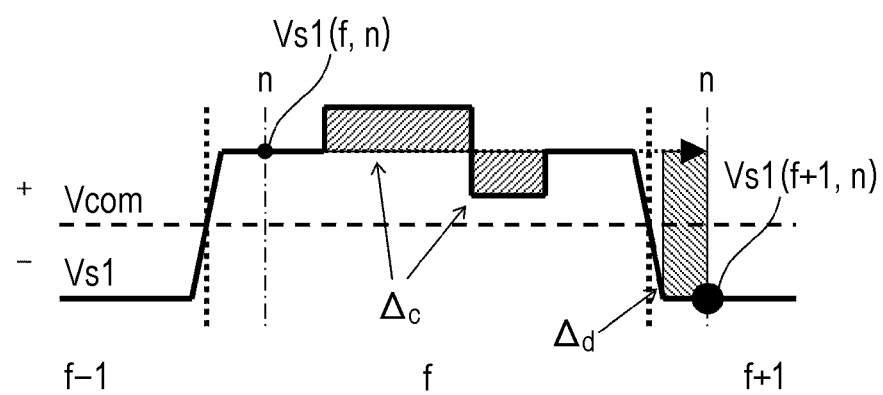
FIG. 5 schematically illustrates a change in a source voltage of a target pixel for one frame in the liquid crystal display device according to Embodiment 1 of the invention.

Next, a method of obtaining the first and second integrated values will be described. FIG. 4 schematically illustrates pixels in a first column and a second column and two source lines arranged on both sides of the pixels in the first column in the liquid crystal display device according to Embodiment 1 of the invention. FIG. 4 illustrates, as an example, pixels 20 in the first column in the liquid crystal display device 2 having pixels of 4320 rows and two source lines S1 and S2 to be connected to the gate line G1 in the pixels 20. Moreover, FIG. 5 schematically illustrates a change in a source potential of a target pixel for one frame in the liquid crystal display device according to Embodiment 1 of the invention. In FIG. 5, Vs indicates a source potential and Vcom indicates a potential of a common electrode. Further, in FIG. 5, a polarity (sign) of the source potential Vs on an upper side of Vcom is + (positive) and a polarity (sign) of the source potential Vs on a lower side of Vcom is − (negative).

In a column of pixels 20, to a pixel 20 in the earliest row as a first row and a pixel 20 in a 4320th row as a last row, a source voltage is sequentially applied from the source driver 7A for one vertical scanning period. A period required for the source voltage to be applied once to all pixels 20 belonging to a certain column is referred to as one frame or one vertical scanning period. It is assumed that the source potential is currently written to the pixel 20 in an nth row ($1 \leq n \leq 4320$) of an fth frame.

As described above, the first integrated value is an integrated value of the source potential of the pixel 20, to which the source voltage is actually applied, for a period of past one frame. The first integrated value is a sum of an integrated value of the source potential Vs1 of the pixel 20 from the nth row to the 4320th row of an f−1th frame and an integrated value from the first row to the nth row of the fth frame.

As described above, the second integrated value is an integrated value obtained by integrating the source potential for a period of one frame with the writing timing of the target pixel 20 as the start point. The second integrated value is a sum of an integrated value from the nth row to the 4320th row of the fth frame and an integrated value from the first row to the nth row of the f+1th frame of the source potential Vs1($f$, $n$) of the pixel 20 in the nth row of the fth frame.

Then, the change amount of the source potential of the target pixel 20, that is, the change amount of the source potential of the pixel 20 in the nth row of the f+1th frame is calculated by a difference between the first integrated value and the second integrated value as described above. The change amount in the pixel 20 in the nth row of the fth frame is represented by the following formula (1) and represented by an area of a shaded part Δc in FIG. 5. The change amount in the pixel 20 in the nth row of the f+1th frame is represented by the following formula (2) and represented by an area of a shaded part Δd in FIG. 5. Accordingly, the change amount (Δ Vs1 (f+1, n)) of the potential of the target pixel 20 is obtained by a formula (3).

[Expression 1]

$$\sum_{k=n}^{4320} (V_{s1}(k) - V_{s1}(f, n)) \quad \text{(formula 1)}$$

[Expression 2]

$$\sum_{k=0}^{n} (V_{s1}(k) - V_{s1}(f, n)) \quad \text{(formula 2)}$$

[Expression 3]

$$\Delta V_{s1}(f+1, n) = \sum_{k=n}^{4320} (V_{s1}(k) - V_{s1}(n)) + \sum_{k=0}^{n} (V_{s1}(k) - V_{s1}(n)) \quad \text{(formula 3)}$$

The present embodiment can be typically carried out as follows. Specifically, the vertical voltage integration unit 33 obtains an integrated value of the source potential of a pixel, to which the source voltage is actually applied, for a period of intended one frame. Moreover, the reference voltage integration unit 34 obtains an integrated value of a reference source potential for the period. Then, the addition and subtraction unit 35 performs processing of calculating the integrated values as needed to obtain a difference between the integrated values.

The change amount of the source potential of the target pixel 20 may be calculated by obtaining a difference between the integrated values for each of frames and then adding resultant differences in the respective frames, as indicated by the formulas (1) to (3). Alternatively, the change amount may be calculated by obtaining respective integrated values for a period of one frame and then adding or subtracting them.

Moreover, the change amount of the source potential of the target pixel 20 may be calculated by calculating, for each of pixels 20, a difference obtained by subtracting the reference source potential (Vs1($f$, $n$) in the aforementioned formula) from the actual source potential (Vs1($k$) in the aforementioned formula) and integrating resultant differences for one frame. In this case, the correction unit 30 may have an appropriate configuration that obtains the integrated value of the differences, instead of the vertical voltage integration unit 33, the reference voltage integration unit 34, and the addition and subtraction unit 35. In this case, for example, the correction unit 30 may have a subtraction unit that obtains the differences of the respective pixels 20 and an integration unit that integrates the obtained differences for one frame.

(Effect of Correction)

Figure 6:
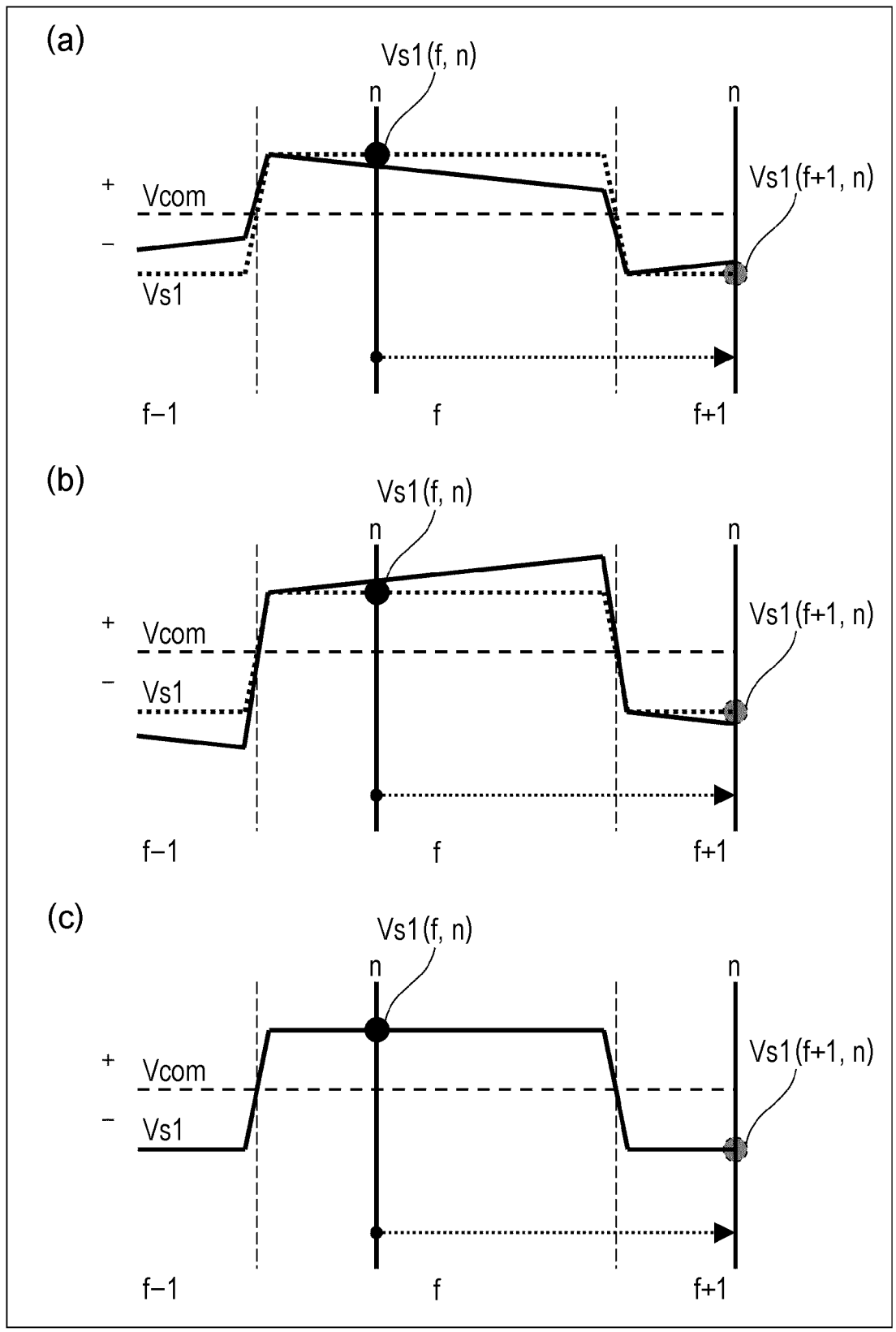
FIG. 6(a) illustrates an example of a source potential of a pixel when the correction unit does not perform correction in the liquid crystal display device of Embodiment 1 of the invention.
FIG. 6(b) illustrates an example of a correction value calculated by the correction unit in the liquid crystal display device of Embodiment 1 described above.
FIG. 6(c) illustrates an example of the source potential of the pixel when the correction unit corrects the source voltage in the liquid crystal display device of Embodiment 1 described above.

FIG. 6($a$) illustrates an example of the source potential of the pixel when the correction unit does not perform correction in the liquid crystal display device of Embodiment 1 of the invention. FIG. 6($b$) illustrates an example of a correction value calculated by the correction unit in the liquid crystal display device of Embodiment 1 described above. FIG. 6($c$) illustrates an example of the source potential of the pixel when the correction unit corrects the source voltage in the liquid crystal display device of Embodiment 1 described above.

When the correction unit 30 does not correct an application value of the source voltage, a change amount of the source voltage applied to the pixel 20 due to polarity inversion may become great. Thus, as illustrated in FIG. 6($a$), the source potential of the pixel 20 when no correction is performed is gradually reduced toward an end of one frame in some cases.

As described above, the correction unit 30 is able to calculate the change amount of the source potential of the target pixel by using a difference between an integrated value of the source potential of the target pixel 20 for past one frame and an integrated value of the source potential of the target pixel 20 for one frame. More specifically, the correction unit 30 calculates, by using the difference between the integrated values, the change amount of the actual source potential as compared to a reference potential (Vs (f, n)) of the source potential of the pixel 20 for the past one frame and calculates the correction value on the basis of the change amount. For example, when the source potential is gradually reduced during one frame as described above, the correction unit 30 calculates, as the correction value, an application value of the source voltage that is gradually increased during one frame as illustrated in FIG. 6($b$).

The source voltage corrected as described above is applied to the pixel 20 from the source line S1, so that the gradual reduction of the source potential due to polarity inversion for one frame is canceled. As a result, an intended source potential that is substantially the same as the reference potential as illustrated in FIG. 6($c$) is achieved.

In the present embodiment, as described above, by using the difference between the integrated values, the correction unit 30 calculates the change amount of the source potential of the target pixel 20, which is used to calculate the correction value of the source voltage applied to the target pixel 20. The difference between the integrated values is a difference between an integrated value of the source potential of the target pixel 20 for past one frame and an integrated value of the source potential of the target pixel 20 for one frame with the writing timing of the target pixel 20 as the start point. Accordingly, in the present embodiment, the source potential that changes without intention during one frame as in a case where the source potential is reduced during one frame is able to be kept at an intended potential.

Embodiment 2

Another embodiment of the invention will be described below. Note that, for convenience of description, a member having the same function as that of the member described in the aforementioned embodiment will be given the same reference sign and description thereof will be omitted. The present embodiment has the same configuration as that of Embodiment 1 described above except that the change amount in the pixel 20 in a predetermined column (for example, first column) is obtained from a sum of the change amount and the change amount in the pixel 20 (for example, in a second column) connected to an adjacent source line, and the present embodiment can be carried out in a similar manner.

For example, the change amount of the source potential of the source line S1 illustrated in FIG. 4 for next one frame is obtained by the method described in Embodiment 1 described above. For example, the change amount of the source potential of the source line S2 is a change amount of the source potential of a pixel next to the pixel 20 in the first column among pixels 20 in the nth row, that is, the pixel 20 in the second column for next one frame. The change amount is obtained similarly to that in the source line S1 except that the target pixel 20 and the target source line are different. That is, the change amount of the source voltage in the source line S2 is represented by formulas in which "s1" in the formulas (1) to (3) is replaced with "s2".

In this manner, the change amount of the source potential of the target pixel 20 (in the nth row and an mth column) for next one frame in the present embodiment is obtained from a sum of the change amount of the source potential in a source line Sm of the pixel 20 in the nth row and the mth column and the change amount of the source potential in a source line Sm+1 of the pixel 20 in the nth row and an m+1th column. Here, both m and n are positive integers. Thus, when a change amount to be obtained is "ΔV1 (n)", the change amount is able to be obtained by the following formula (4).

[Expression 4]

$$\Delta V_1(n) = \Delta V_{s1}(f+1,n) + \Delta V_{s2}(f+1,n) \quad \text{(formula 4)}$$

In the present embodiment, the vertical voltage integration unit 33 typically obtains integrated values of source potentials of two adjacent pixels for a period of intended one frame. Moreover, the reference voltage integration unit 34 obtains integrated values of reference source potentials of the respective two adjacent pixels 20 for the period. Then, the addition and subtraction unit 35 obtains a difference between the integrated values. The addition and subtraction unit 35 appropriately applies calculation processing to the integrated values as needed.

In this manner, in the present embodiment, the change amount of the potential of the target pixel 20 is a sum of a first change amount and a second change amount. The first change amount is a difference of integrated values when the source line S1 arranged on one side of the pixel 20 is a source line of the target pixel 20 (for example, in the mth column). The second change amount is a difference of integrated values when the source line S2 arranged on the other side of the target pixel 20 is the source line of the target pixel 20 (for example, in the m+1th column).

According to the present embodiment, the change amount of the source potential of the target pixel due to an influence of a source line that is adjacent but not electrically connected to pixels in the single source line structure described above, for example, due to a parasitic capacitance is able to be more accurately obtained. Accordingly, the correction unit 30 is able to calculate a more accurate correction value. As a result, the present embodiment is much more effective from a viewpoint of displaying an intended high-definition image also in a last half (lower side of a screen) of one frame.

Embodiment 3

Another embodiment of the invention will be described below. Note that, for convenience of description, a member having the same function as that of the member described in the aforementioned embodiments will be given the same reference sign and description thereof will be omitted. The present embodiment has the same configuration as that of Embodiment 1 described above except for a method of obtaining the change amount of the source potential and can be carried out similarly. Note that, in the present embodiment, it is assumed that the source voltage is applied by a method (also referred to as "one frame inversion") of switching polarities (positive and negative) of the source voltage every frame.

Figure 7:
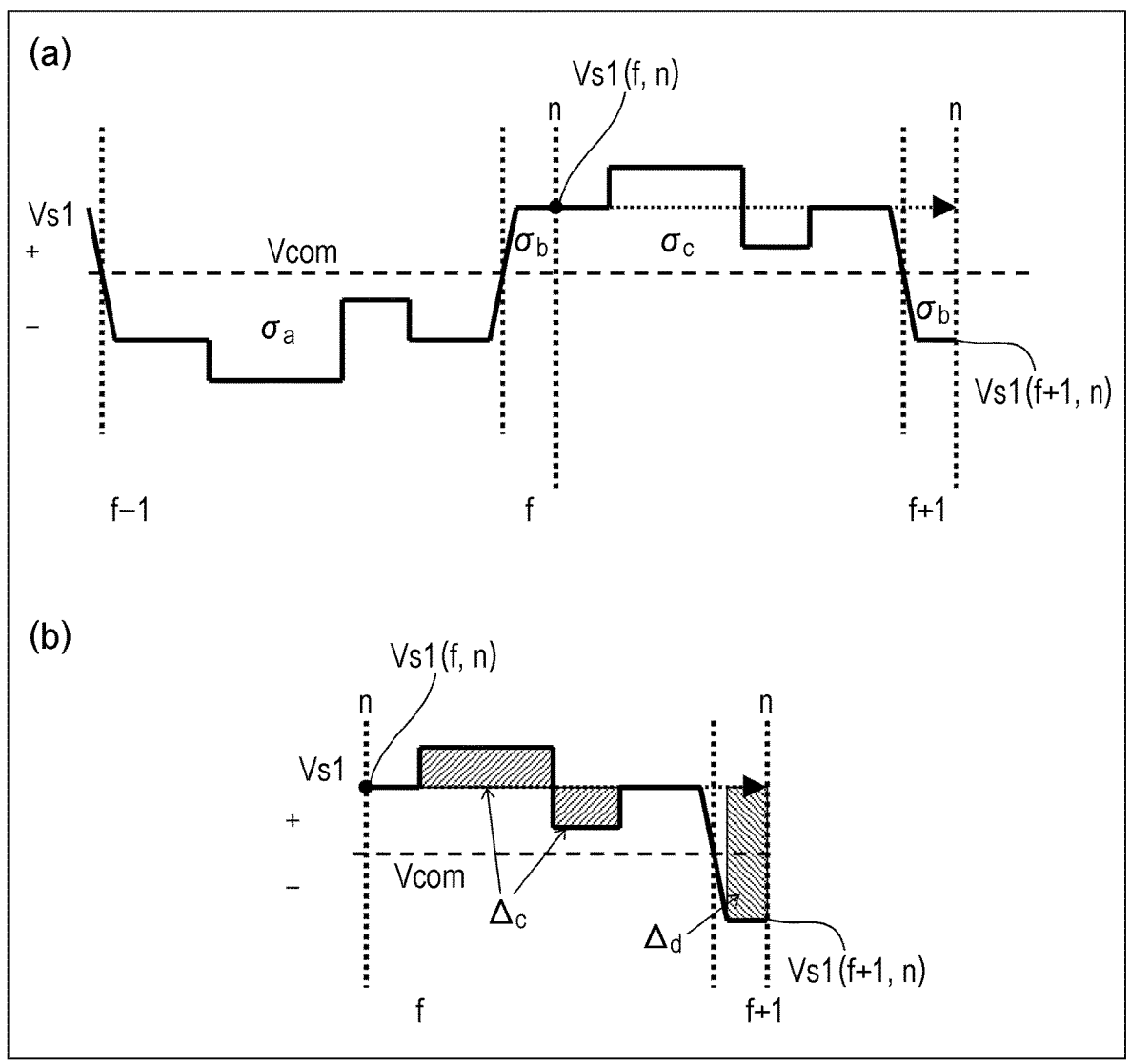
FIG. 7(a) schematically illustrates a change in the source potential for a period from a previous frame to a next frame in the liquid crystal display device that applies the source voltage by one frame inversion, and FIG. 7(b) schematically illustrates a change in the source potential for a period from a present time to next one frame in FIG. 7(a).

FIG. 7(a) schematically illustrates a change in the source potential for a period from a previous frame to a next frame in the liquid crystal display device that applies the source voltage by the one frame inversion. FIG. 7(b) schematically illustrates a change in the source potential for a period from a present time to next one frame in FIG. 7(a). The pixel 20 to which writing is currently performed is a pixel in an nth column of the fth frame. Here, for example, in a case of a frame rate of 60 frames per second, a time required for vertical scanning for one frame is very short and 1/60 second. Thus, the source potential in the frame (f) one frame before is a good approximation of the source potential of a previous frame (f−1) in both a moving image and a still image.

An integrated value σa of the source potential of the previous frame (f−1th frame) is represented by a formula (5). Moreover, an integrated value σb of the source potential up to a present pixel in the present frame (fth frame) is represented by a formula (6). Further, an integrated value σ0 of a source potential Vn at a present time in the pixel 20 in the nth column for one frame is represented by a formula (7).

[Expression 5]

$$\sigma_a = \sum_{k=0}^{4320} V_{(f-1,k)} \quad \text{(formula 5)}$$

[Expression 6]

$$\sigma_b = \sum_{k=0}^{n} V_{(f+1,k)} \quad \text{(formula 6)}$$

[Expression 7]

$$\sigma_0 = (4320) \times V_n \quad \text{(formula 7)}$$

Δc indicated in FIG. 7(b) is an integrated value of the change amount of the source potential after the present time in the present frame as compared to the source potential Vn of the pixel in the nth column at the present time. Δc is obtained by subtracting an integrated value of Vn of pixels in nth and subsequent columns from σc. Since the source potential of the previous frame (f−1th frame) is a good approximation of the source potential of the present frame (fth frame), an absolute value of σc is a numerical value obtained by subtracting σb from σa as indicated by FIG. 7(a). Thus, Δc is represented by a formula (8).

[Expression 8]

$$\Delta_c = \sigma_c - (4320-n) \times V_n \qquad \text{(formula 8)}$$
$$= \sigma_a - \sigma_b - (4320-n) \times V_n$$

An absolute value of Δd is obtained by subtracting an integrated value σb of the actually applied source potential from an integrated value of the source potential Vn of the pixel in the nth column of the f+1th frame, as indicated by FIG. 7(b).

Here, in the present embodiment, a sign of an integrated value is appropriately adjusted in accordance with a difference of polarities of source potentials between frames. For example, σa is a value for the f−1th frame and a polarity of the source potential thereof is opposite to a polarity of the source potential in the fth frame. Thus, a sign of σa is reversed in the formula (8). Further, for Δd, a polarity in the f+1th frame is inverted from that in the fth frame. Thus, for Δd, a sign of the integrated value of the actual source potential is reversed. Accordingly, Δd is represented by a formula (9).

[Expression 9]

$$\Delta_d = -n \times V_n - \sigma_b \qquad \text{(formula 9)}$$

The change amount of the source potential of the pixel 20 in the nth row of the present frame (f+1th frame) is obtained by a sum of Δc and Δd. Thus, the change amount of the source potential of the pixel 20 in the nth row of the present frame is obtained by a formula (10).

[Expression 10]

$$\Delta = -\sigma_a - 2 \times \sigma_b - 4320 \times V_n \qquad \text{(formula 10)}$$

The vertical voltage integration unit 33, the reference voltage integration unit 34, and the addition and the subtraction unit 35 that are described above are able to perform calculation of the change amount of the integrated value of the source potential in Embodiment 3. For example, the vertical voltage integration unit 33 calculates σa, σb, and a difference therebetween on the basis of an integrated value of the past actual source potential. The reference voltage integration unit 34 calculates an integrated value ((4320−n)×Vn) in the fth frame in a case of the source potential Vn of the pixel in the nth column of the fth frame. Then, the addition and subtraction unit 35 applies sign reverse processing by polarity inversion as needed for calculated values by both of the integration units, calculates σc and σd of the formula (8) and the formula (9), and calculates a sum thereof.

Alternatively, the correction unit 30 that includes another component as needed is able to calculate the aforementioned change amount in Embodiment 3. For example, the correction unit 30 that further includes a sign reverse unit that changes a positive or negative sign of the source potential by the aforementioned polarity inversion of the source potential is also able to calculate the aforementioned change amount. The sign reverse unit is, for example, between the vertical voltage integration unit 33, the reference voltage integration unit 34, and the addition and subtraction unit 35 and changes a positive or negative sign of calculated values of both of the integration units as needed.

In this manner, in Embodiment 3, when the polarity of the source potential is inverted between continuous frames, the correction unit 30 uses the integrated value by making a positive or negative sign thereof reversed in accordance with inversion of the polarity. Accordingly, in Embodiment 3, the liquid crystal display device 2 is configured such that the source voltage whose polarity is inverted every frame is applied to a source line. Then, the correction unit 30 calculates the change amount of the source potential of the target pixel 20 by replacing the integrated value of the source potential for previous one frame with the integrated value of the source potential for the present frame. Embodiment 3 is much more effective from a viewpoint of obtaining the change amount more simply.

Note that, Embodiment 3 is able to be applied to an embodiment in which the change amount of the source potential of the pixel 20 is obtained only from the change amount of the source potential in one source line Sm of source lines of the pixel 20 in the nth row. Moreover, Embodiment 3 is also able to be applied to an embodiment in which the change amount of the source potential of the target pixel 20 (in the nth row and the mth column) is obtained from a sum of the change amount of the source potential in the one source line Sm of the pixel 20 in the nth row and the mth column and the change amount of the source potential in the other source line Sm+1 of the pixel 20 in the m+1th column.

Embodiment 4

Another embodiment of the invention will be described below. Note that, for convenience of description, a member having the same function as that of the member described in the aforementioned embodiments will be given the same reference sign and description thereof will be omitted. In the present embodiment, similarly to Embodiment 3, the change amount of the source potential of the target pixel 20 is calculated by replacing an integrated value of the source potential for previous one frame with an integrated value of the source potential for a present frame. In the present embodiment, the source voltage is applied by a method (also referred to as "two frame inversion") of switching polarities (positive and negative) of the source voltage every two frames. The present embodiment is similar to Embodiment 3 except for a method of applying the source voltage.

Figure 8:
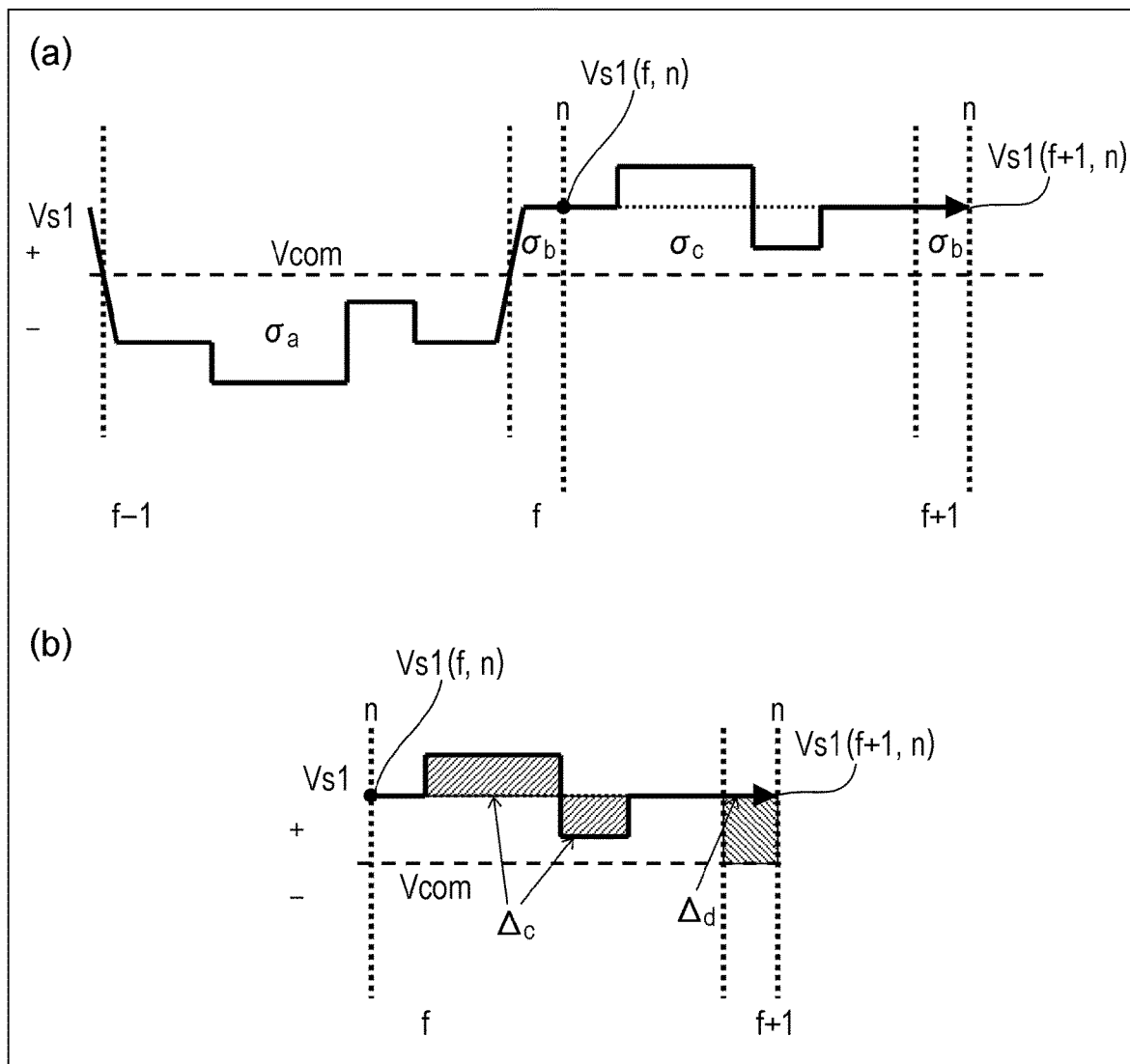
FIG. 8(a) schematically illustrates a change in the source potential for a period from a previous frame to a next frame when a polarity of the source potential is inverted in a present frame in the liquid crystal display device that applies the source voltage by two frame inversion, and FIG. 8(b) schematically illustrates a change in the source potential for a period from a present time to next one frame in FIG. 8(a).

FIG. 8(a) schematically illustrates a change in the source potential for a period from a previous frame to a next frame when a polarity of the source potential is inverted in a present frame in the liquid crystal display device that applies the source voltage by the two frame inversion. FIG. 8(b) schematically illustrates a change in the source potential for a period from a present time to next one frame in FIG. 8(a). The polarity of the applied source voltage is the same between the f+1th frame and the fth frame. The polarity of the applied source voltage is opposite between the fth frame and the f−1th frame.

Since the source potential in a certain frame is a good approximation of the source potential in a frame continued thereto, σc is able to be obtained by subtracting σb from σa as is clear from FIGS. 8(a) and 8(b). Thus, Δc is represented by the following formula (11). Moreover, Δd is able to be obtained by subtracting the integrated value of Vn in the f+1th frame from σb, and is thus represented by the following formula (12). Accordingly, a change amount Δ of the source potential of the pixel 20 in the nth row of a next frame (f+1th frame) when the polarity is inverted in a previous frame in the two frame inversion is obtained by the following formula (13).

[Expression 11]

$$\Delta_c = \sigma_c - (4320 - n) \times V_n \quad \text{(formula 11)}$$
$$= -\sigma_a - \sigma_b - (4320 - n) \times V_n$$

[Expression 12]

$$\Delta_d = -n \times V_n + \sigma_b \quad \text{(formula 12)}$$

[Expression 13]

$$\Delta = -\sigma_a - 4320 \times V_n \quad \text{(formula 13)}$$

Figure 9:
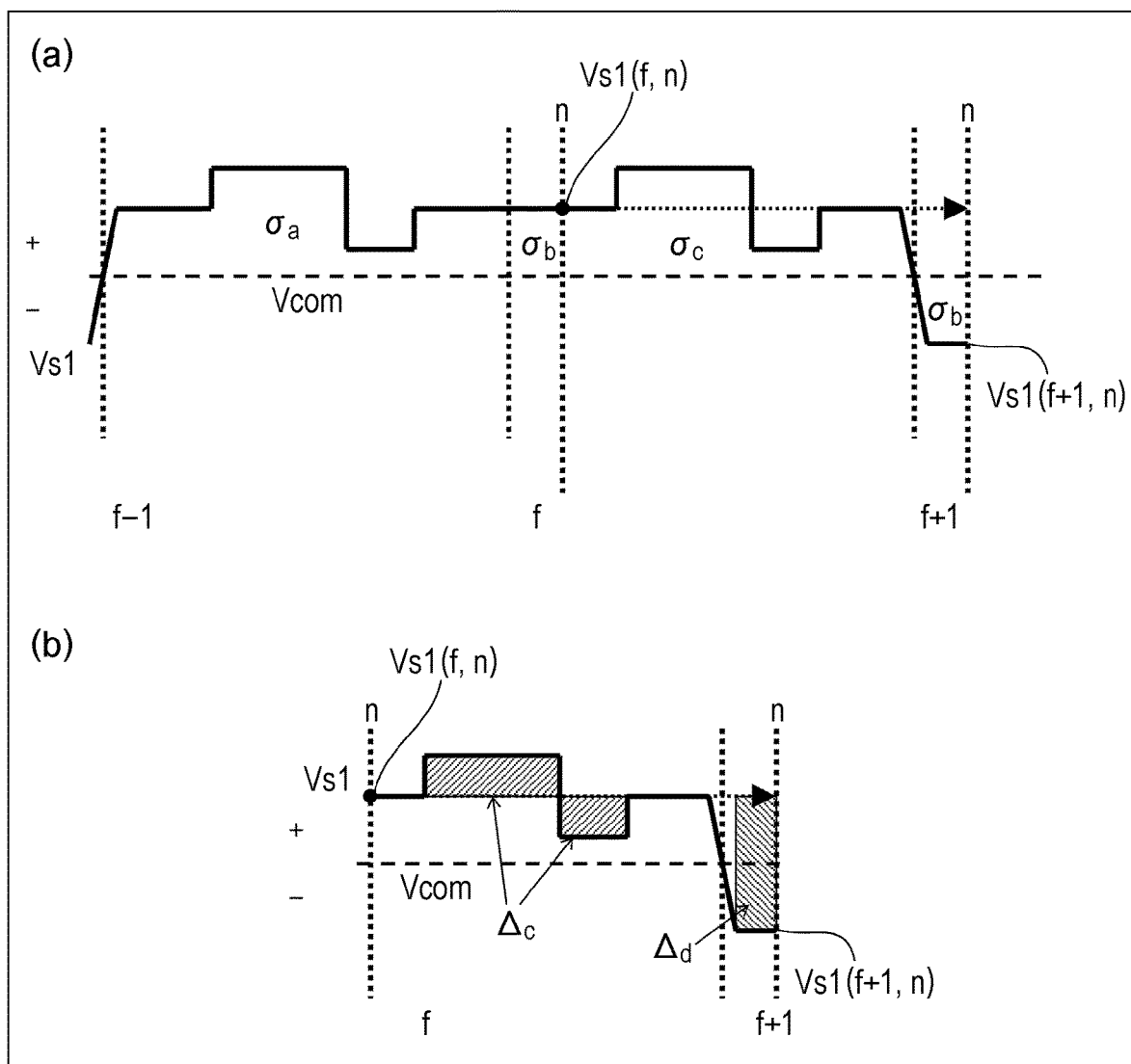
FIG. 9(a) schematically illustrates a change in the source potential for a period from a previous frame to a next frame when the polarity of the source potential is inverted in the next frame in the liquid crystal display device that applies the source voltage by the two frame inversion, and FIG. 9(b) schematically illustrates a change in the source potential for a period from a present time to next one frame in FIG. 9(a).

Next, a case where the polarity of the next frame (f+1) is inverted in the two frame inversion will be described. FIG. 9(a) schematically illustrates a change in the source potential for a period from a previous frame to a next frame when a polarity of the source potential is inverted in the next frame in the liquid crystal display device that applies the source voltage by the two frame inversion. FIG. 9(b) schematically illustrates a change in the source potential for a period from a present time to next one frame in FIG. 9(a).

Since the source potential in a certain frame is a good approximation of the source potential in a frame continued thereto, σc is able to be obtained by subtracting σb from σa as is clear from FIGS. 9(a) and 9(b). Thus, Δc is represented by the formula (8). Moreover, Δd is able to be obtained by subtracting the integrated value of Vn in the f+1th frame from σb, and is thus represented by the formula (9). Further, σa and σc have the same polarity. Thus, the change amount Δ of the source potential of the pixel 20 in the nth row for the next frame (f+1th frame) when the polarity is inverted in the present frame in the two frame inversion is obtained by the following formula (14).

[Expression 14]

$$\Delta = \sigma_a - 2 \times \sigma_b - 4320 \times V_n \quad \text{(formula 14)}$$

The change amount of the integrated value of the source potential in Embodiment 4 can be calculated by the correction unit 30 similarly to that in Embodiment 3 described above.

As described above, in Embodiment 4, the liquid crystal display device 2 is configured such that the source voltage whose polarity is inverted every two frames is applied to a source line. When the polarity of the source potential is inverted between continuous frames, the correction unit 30 uses the integrated value of the source potential by making a positive or negative sign thereof reversed in accordance with inversion of the polarity. Accordingly, Embodiment 4 is also much more effective from a viewpoint of obtaining the change amount more simply, similarly to Embodiment 3.

Note that, similarly to Embodiment 3, Embodiment 4 is also able to be applied to an embodiment in which the change amount of the source potential of the target pixel 20 is obtained only from the change amount of the source potential of the pixel 20 in the nth row and the mth column, which is targeted. Moreover, similarly to Embodiment 3, Embodiment 4 is also able to be applied to an embodiment in which the change amount of the source potential of the target pixel 20 is obtained from a sum of the change amount of the source potential of the pixel 20 in the nth row and the mth column and the change amount of the source potential of the pixel 20 in nth row and the m+1th column.

MODIFIED EXAMPLE

The liquid crystal display device in the aforementioned embodiments is the television receiver that includes the liquid crystal display device and the tuner, but may be a liquid crystal display device other than the television receiver. For example, the liquid crystal display device may be a monitor for a personal computer, a monitor in which a video recorded in various recording devices, various recording media, or the like is reproduced, or an image display device such as a tablet or a smartphone.

Moreover, the correction unit in each of the aforementioned embodiments may further include another component in a range where an effect of the embodiment is able to be obtained. For example, the correction unit may further include a frame memory delay adjustment unit. The frame memory delay adjustment unit is arranged, for example, so as to be connected to the input unit and the correction value addition unit in parallel to units from the gray-scale-to-voltage conversion unit to the coefficient multiplication unit that are described above. The frame memory delay adjustment unit is configured to delay an input of image data, which is input to the input unit, to the correction value addition unit by one frame. Thereby, a frame to be corrected is able to be the same as a frame used to obtain a correction value. Thus, this is effective when a display image changes every frame as in a moving image.

Moreover, in the aforementioned embodiments, an integrating period of an actual integrated value of the source potential and an integrated value of the source potential of the target pixel is defined as one frame. The integrating period may be a range where a change in the source potential, which is to be corrected, is able to be detected and is not strictly limited to one frame. For example, the integrating period may be a range where, in a case of gradual reduction of the source potential described above, an inclination thereof is able to be detected, and is able to be appropriately decided, for example, from a range of 0.5 to 1 frame.

Moreover, in the aforementioned embodiments, though the change amount of the source potential for past one frame is obtained with the source potential of the pixel of a frame one frame before as a reference potential, the reference potential may be another potential selected from potential values that can be references for obtaining the change amount. For example, by appropriately changing the formulas described above, the aforementioned embodiments are also able to be carried out with the potential (Vcom) of the common electrode as the reference potential or with any potential other than Vcom as the reference potential.

In addition, differently from the aforementioned embodiments, the liquid crystal display device may include a double source line structure. The double source line structure is a structure in which source lines electrically connected to the pixels 20 are alternately different in rows or columns. For example, in the double source line structure, among the pixels 20 in the same column, a pixel 20 in an odd-numbered row is connected to one of source lines S and a pixel 20 in an even-numbered row is connected to the other source line S. Moreover, among the pixels 20 in the same row, a pixel 20 in an odd-numbered column is connected to one of source lines S and a pixel 20 in an even-numbered column is connected to the other source line S. Such a double-source-drive liquid crystal display device is able to have an enhanced charging rate as compared to a single-source-drive liquid crystal display device.

Note that, the correction unit 30 described above is, for example, a logic circuit (hardware) formed in an integrated circuit (IC chip) or the like, but may be realized by software. In the latter case, the correction unit 30 includes a computer that executes a command of a program that is software realizing each of functions. The computer includes, for example, at least one processor (control device) and at least one computer-readable recording medium in which the program is stored. An intended function of the correction unit 30 is exerted by the processor in the computer reading and executing the program from the recording medium.

As the processor, for example, a CPU (Central Processing Unit) may be used. As the recording medium, a "non-transitory tangible medium" may be used. Examples of such a medium include a ROM (Read Only Memory), a tape, a disk, a card, a semiconductor memory, and a programmable logic circuit. Moreover, the correction unit 30 may further include a RAM (Random Access Memory) or the like that develops the program.

Moreover, the program may be supplied to the computer via any transmission medium (such as a communication network or a broadcast wave) which enables the program to be transmitted. Note that, in an embodiment of the invention, correction of the source potential by the correction unit 30 can also be implemented in a form of a data signal in which the program is embodied through electronic transmission and which is embedded in a carrier wave.

Next, more specific operation examples of the invention will be described below.

Operation Example 1

Figure 10:
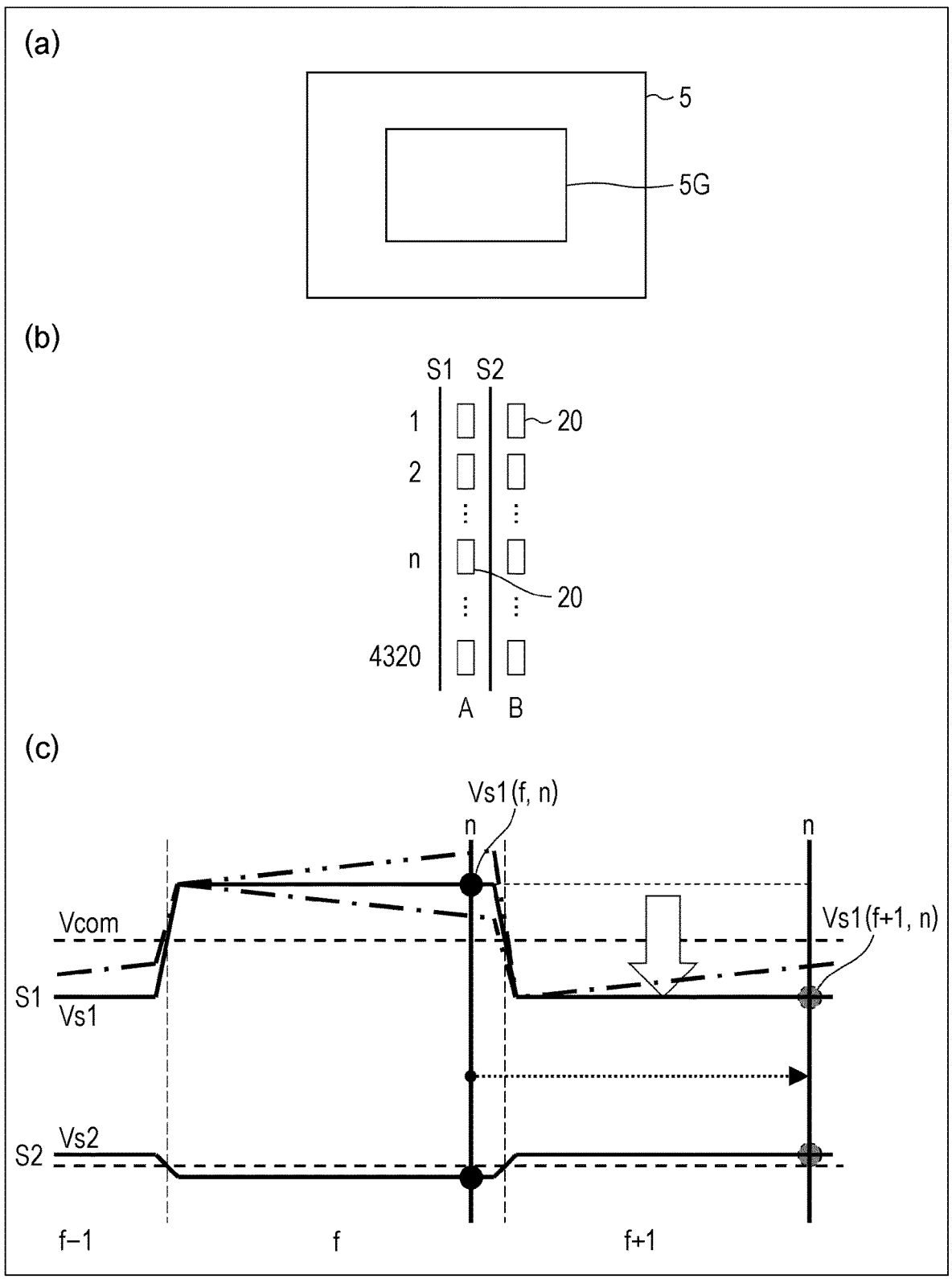
FIG. 10(a) schematically illustrates an image displayed in the liquid crystal display device in an operation example 1, FIG. 10(b) schematically illustrates arrangement of pixels and source lines in the liquid crystal display device, and FIG. 10(c) schematically illustrates a change in the source potential in the liquid crystal display device.

FIG. 10(*a*) schematically illustrates an image displayed in the liquid crystal display device in an operation example 1. FIG. 10(*b*) schematically illustrates arrangement of pixels and source lines in the liquid crystal display device. FIG. 10(*c*) schematically illustrates a change in the source potential in the liquid crystal display device.

In the operation example 1, a rectangular green image (still image) 5G is displayed in a center part of the liquid crystal display panel 5 of the television receiver having a configuration as described above. As illustrated in FIG. 10(*b*), the liquid crystal display device of the television receiver includes a pixel 20A in a column A electrically connected to the source line S1 and a pixel 20B in a column B electrically connected to the source line S2. The pixel 20A is a pixel that generates a green color and the pixel 20B is a pixel that generates a blue color.

Note that, in the present operation example, the liquid crystal display device is driven by a single-source-drive method in which a pixel is connected to only one of the source lines on both sides thereof. This is because both of the source lines are arranged at positions where the source lines are able to be connected to the pixel and an influence of the source potential due to a parasitic capacitance or the like caused by such arrangement of the source lines is able to be sufficiently reflected even in a case of single-source drive.

In the present operation example, no polarity inversion occurs between the source lines and the source voltage whose predetermined polarity is alternately changed (for example, positive in the source line S1 and negative in the source line S2, etc.) in a gate direction is applied to the source lines. The source voltage is applied to each of the source lines by the one frame inversion.

As described above, when no correction is performed, the source potential in the source line S1 is reduced toward a latter stage (toward a lower part of a screen) by being influenced by polarity inversion every frame as indicated by a one-dot chain line of FIG. 10(*c*). The correction unit detects such gradual reduction of the source potential in accordance with a difference of integrated values of the source potential and applies a corrected source voltage to the source line S1. The corrected source voltage is a source voltage that is gradually increased so as to cancel the gradual reduction described above for a period of one frame as indicated by a two-dot chain line of FIG. 10(*c*). By application of such a corrected source voltage, the source potential in the pixel 20A is kept at an intended source potential in all frames as indicated by a solid line of FIG. 10(*c*).

Operation Example 2

Figure 11:
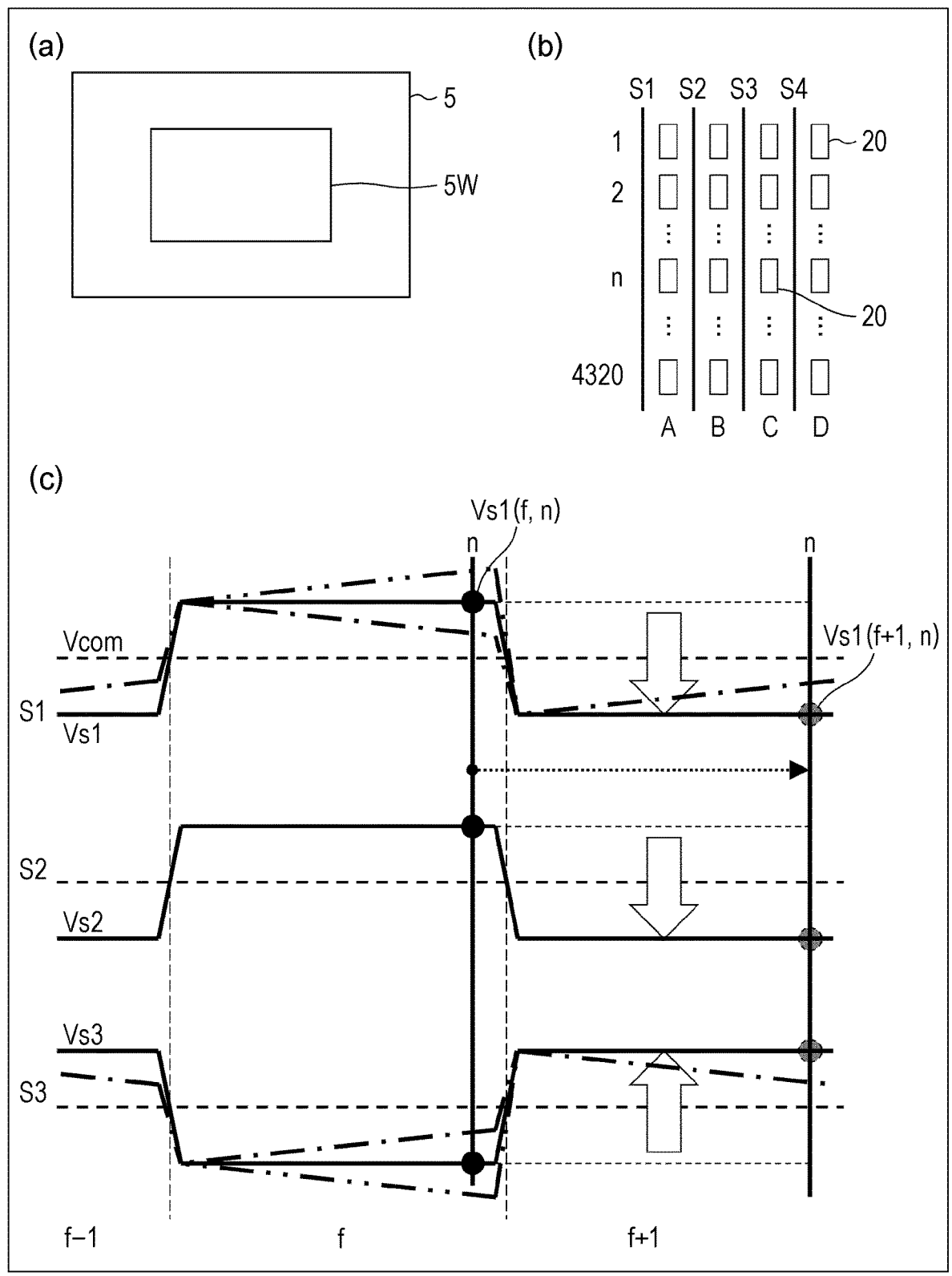
FIG. 11(a) schematically illustrates an image displayed in the liquid crystal display device in an operation example 2, FIG. 11(b) schematically illustrates arrangement of pixels and source lines in the liquid crystal display device, and FIG. 11(c) schematically illustrates a change in the source potential in the liquid crystal display device.

FIG. 11(*a*) schematically illustrates an image displayed in the liquid crystal display device in an operation example 2. FIG. 11(*b*) schematically illustrates arrangement of pixels and source lines in the liquid crystal display device. FIG. 11(*c*) schematically illustrates a change in the source potential in the liquid crystal display device.

In the operation example 2, a rectangular white image (still image) 5W is displayed in a center part of the liquid crystal display panel 5. As illustrated in FIG. 11(*b*), the liquid crystal display device of the television receiver includes a pixel 20A in a column A electrically connected to the source line S1, a pixel 20B in a column B electrically connected to the source line S2, and a pixel 20C in a column C electrically connected to the source line S3. The pixel 20A is a pixel that generates a red color, the pixel 20B is a pixel that generates a green color, and the pixel 20C is a pixel that generates a blue color.

Note that, also in the present operation example, the liquid crystal display device is driven by the single-source-drive method. In the source lines, no polarity inversion occurs between the source lines and the source voltage whose polarity is alternately changed every two lines (for example, such as +, −, −, and + in a case of the source line S1 to the source line S4) in a gate direction are applied to the source lines. The source voltage is applied to each of the source lines by the one frame inversion.

In the present operation example, for example, the polarity of the source voltage applied to the source line S1 for the red pixel 20A is the same as the polarity of the source potential applied to the source line S2 for the green pixel 20B adjacent thereto. Therefore, as illustrated in FIG. 11(*c*), a change in the source potential in the source line S1 shifts in the same direction as that of a change in the source potential in the source line S2. Thus, the source potential in the source line S1 when no correction is performed changes due to the influence of polarity inversion described above as indicated by a one-dot chain line in s1 of FIG. 11(*c*), for example.

On the other hand, the polarity of the source voltage applied to the source line S2 is opposite to the polarity of the source potential applied to the source line S3 for the blue pixel 20C adjacent thereto. Therefore, a change in the source potential in the source line S2 shifts, for example, to a positive side, but a change in the source potential in the source line S3 shifts, for example, to a negative side. Thus, the source potential of the source line S2 does not change as illustrated in FIG. 11(*c*).

The source potential in the source line S3 changes as indicated by a one-dot chain line in s3 of FIG. 11(*c*) because of a similar reason to that in the source line S1 described above. In this manner, in the operation example 2, the change in the source potential can be caused in accordance with a polarity of a voltage of an adjacent source line. The correction unit detects such gradual reduction of the source potential in accordance with a difference of integrated values of the source potential and applies a corrected source voltage to the source line S1 and the source line S3. Thereby, the polarity of the source voltage is different between the source line S1 and the source line S3, but the source voltage is gradually increased so as to cancel the gradual reduction described above for a period of one frame as indicated by two-dot chain lines in s1 and s3 of FIG. 11(c). As a result, the source potential in each of the pixel 20A and the pixel 20C is kept at an intended source potential in all frames as indicated by a solid line of FIG. 11(c).

Operation Example 3

Figure 12:
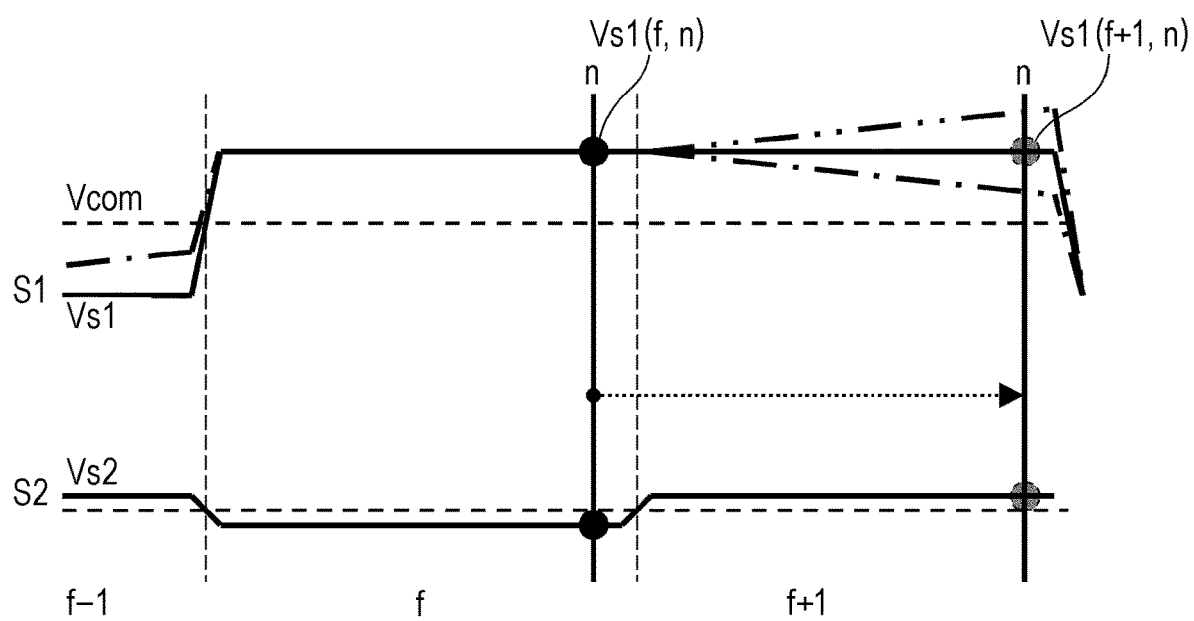
FIG. 12 schematically illustrates a change in the source potential of the liquid crystal display device in an operation example 3.

An operation example 3 is the same as the operation example 1 except that the source voltage is applied by the two frame inversion in the source line S1. FIG. 12 schematically illustrates a change in the source potential of the liquid crystal display device in the operation example 3.

The source potential in the source line S1 has the same polarity in the fth frame and the f+1th frame. The source potential does not change in a frame whose polarity is not inverted in a next frame. Thus, the source potential of the source line S1 is fixed in the fth frame.

On the other hand, in a frame whose polarity is inverted in a next frame, the source potential changes similarly to a case of the one frame inversion. That is, in such a frame, due to an influence of polarity inversion between a frame and a next frame, the source potential greatly changes toward a lower side of a screen, and the source potential when no correction is performed is gradually reduced as indicated by a one-dot chain line of FIG. 12. Thus, the source potential in the source line S1 changes in the f−1th frame and the f+1th frame.

The correction unit detects such a change in the source potential in accordance with a difference of integrated values of the source potential and applies a corrected source voltage, for example, as indicated by a two-dot chain line of FIG. 12 to the source line S1. Thereby, the source potential in the source line S1 is kept at an intended source potential in all frames as indicated by a solid line of FIG. 12.

CONCLUSION

A display control device according to an aspect 1 of the invention controls display of a liquid crystal display device including a plurality of gate lines, a plurality of source lines, and display pixels arranged correspondingly at intersections of the gate lines and the source lines. The display control device includes a correction unit that corrects a source voltage applied to each of the display pixels. The correction unit is configured to calculate a change amount of a source potential of a target display pixel of the display pixels, which is used to calculate a correction value of a source voltage applied to the target display pixel, for next one frame by replacement with an integrated value of the source potential of the target display pixel for past one frame with a writing timing of the target display pixel as a start point.

According to the aforementioned configuration, a correction amount of the source voltage in writing is decided on the basis of an integrated value of a change amount of the source potential obtained by going backward from a writing time by one frame. Thus, according to the aforementioned configuration, image display control by which effective correction can be performed even for a biased change in the source potential for one frame in the liquid crystal display device is able to be achieved.

The display control device according to an aspect 2 of the invention may be configured such that the change amount is a sum of a first change amount, which is a difference of integrated values when a source line of the source lines, arranged on one side of the target display pixel is a source line of the target display pixel, and a second change amount, which is a difference of integrated values when a source line of the source lines, arranged on an other side of the target display pixel is the source line of the target display pixel, in the aspect 1.

According to the aforementioned configuration, the change amount of the source potential of the display pixel, which is caused by the source voltage of not only one of the source lines on both sides of the display pixel but also the other source line is calculated. Thus, the aforementioned configuration is much more effective from a viewpoint of accurately calculating the change amount.

The display control device according to an aspect 3 of the invention may be configured such that the correction unit calculates the change amount by using a difference between the integrated value of the source potential of the target display pixel for the past one frame and an integrated value of the source potential of the target display pixel for one frame, in the aspect 1 or 2.

According to the aforementioned configuration, the calculation of the change amount of the actual source potential for past one frame is further simplified. Thus, the aforementioned configuration is much more effective from a viewpoint of reduction in a calculation time of the change amount and speeding up of calculation processing.

The display control device according to an aspect 4 of the invention may be configured such that, when a polarity of a source potential is inverted between continuous frames, the correction unit makes a positive or negative sign of the integrated value reversed in accordance with inversion of the polarity, in the aspect 3.

According to the aforementioned configuration, the calculation of the change amount of the actual source potential for past one frame is further simplified. Thus, the aforementioned configuration is much more effective from a viewpoint of reduction in a calculation time of the change amount and speeding up of calculation processing.

The display control device according to an aspect 5 of the invention may be configured such that the liquid crystal display device applies the source voltage, a polarity of which is inverted every frame, to the source lines, in any of the aspects 1 to 4.

The aforementioned configuration is much more effective from a viewpoint of suppressing deviation of the polarity of the source potential in the display pixel and an influence on image display that is caused accordingly.

The display control device according to an aspect 6 of the invention may be configured such that the liquid crystal display device apples the source voltage, a polarity of which is inverted every two frames, to the source lines, in any of the aspects 1 to 4.

The aforementioned configuration is much more effective from a viewpoint of simplifying a voltage application operation for suppressing deviation of the polarity of the source potential in the display pixel and an influence on image display that is caused accordingly.

The liquid crystal display device according to an aspect 7 of the invention includes the display control device according to any of the aspects 1 to 6.

According to the aforementioned configuration, image display in which an influence on image display due to a biased change in the source potential for one frame is suppressed is able to be performed.

A television receiver according to an aspect 8 of the invention includes the liquid crystal display device according to the aspect 7.

According to the aforementioned configuration, display of an image with high quality with use of the correction described above is able to be performed also in a television receiver, such as an 8K television, which is capable of high-definition image display.

The invention is applied to a liquid crystal display device in which source lines are arranged on both sides of one pixel. The invention is able to be suitably used, in particular, for a double-source-drive liquid crystal display device.

The invention is not limited to each of embodiments described above and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1 television receiver
2 liquid crystal display device
3 back-side cabinet
4 front-side cabinet
5 liquid crystal display panel
5G green image
5W white image
6 gate driver
7A to 7D source driver
11 display unit
12 CS driver
20, 20A, 20B, 20C pixel
21 switching element
22 pixel electrode
23 pixel capacitor
30 correction unit
31 input unit
32 gray-scale-to-voltage conversion unit
33 vertical voltage integration unit
34 reference voltage integration unit
35 addition and subtraction unit
36 coefficient multiplication unit
37 correction value calculation unit
38 correction value addition unit
39 output unit
CS1 to CS4 storage capacitor wire
G1 to G4 gate line
S1 to S5 source line

The invention claimed is:

1. A display control device that controls display of a liquid crystal display device including a plurality of gate lines, a plurality of source lines, and display pixels arranged correspondingly at intersections of the gate lines and the source lines, the display control device comprising;
   a correction unit that corrects a source voltage applied to each of the display pixels, wherein
   the correction unit calculates a change amount of a source potential of a target display pixel of the display pixels, which is used to calculate a correction value of a source voltage applied to the target display pixel, for next one frame by referring to an integrated value of the source potential of the target display pixel for past one frame with a writing timing of the target display pixel as a start point, and
   the change amount is a sum of a first change amount, which is a difference of integrated values when a source line of the source lines, arranged on one side of the target display pixel is a source line of the target display pixel, and a second change amount, which is a difference of integrated values when a source line of the source lines, arranged on an other side of the target display pixel is the source line of the target display pixel.

2. The display control device according to claim 1, wherein the liquid crystal display device is configured to apply the source voltage, a polarity of which is inverted every frame, to the source lines.

3. The display control device according to claim 1, wherein the liquid crystal display device is configured to apply the source voltage, a polarity of which is inverted every two frames, to the source lines.

4. A liquid crystal display device comprising the display control device according to claim 1.

5. A television receiver comprising the liquid crystal display device according to claim 4.

6. A display control device that controls display of a liquid crystal display device including a plurality of gate lines, a plurality of source lines, and display pixels arranged correspondingly at intersections of the gate lines and the source lines, the display control device comprising;
   a correction unit that corrects a source voltage applied to each of the display pixels,
   wherein the correction unit calculates a change amount of a source potential of a target display pixel of the display pixels, which is used to calculate a correction value of a source voltage applied to the target display pixel, for next one frame by using a difference between a first integrated value of a source potential of a source line connected with the target display pixel for the past one frame and a second integrated value of the source potential of the source line connected with the target display pixel for one frame with a writing timing of the target display pixel.

7. The display control device according to claim 6, wherein, when a polarity of a source potential is inverted between continuous frames, the correction unit makes a positive or negative sign of the integrated value reversed in accordance with inversion of the polarity.

* * * * *